May 13, 1924.
A. GARCIA
1,493,929
AUTOMOBILE FENDER AND BRAKE
Filed Aug. 10, 1923
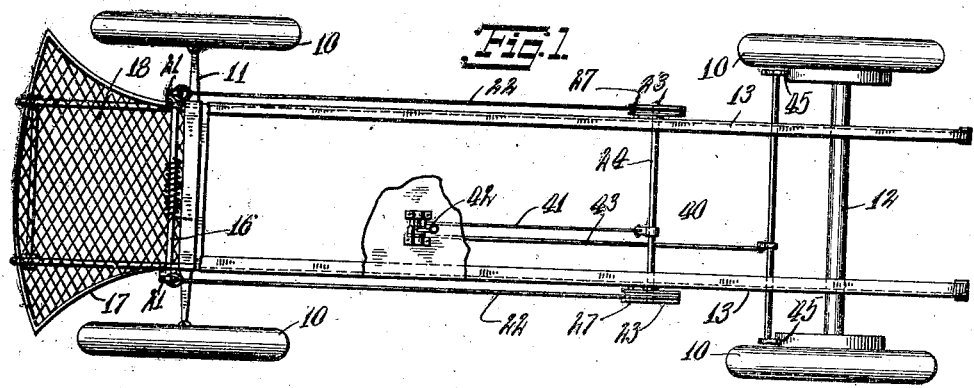
Fig. 1
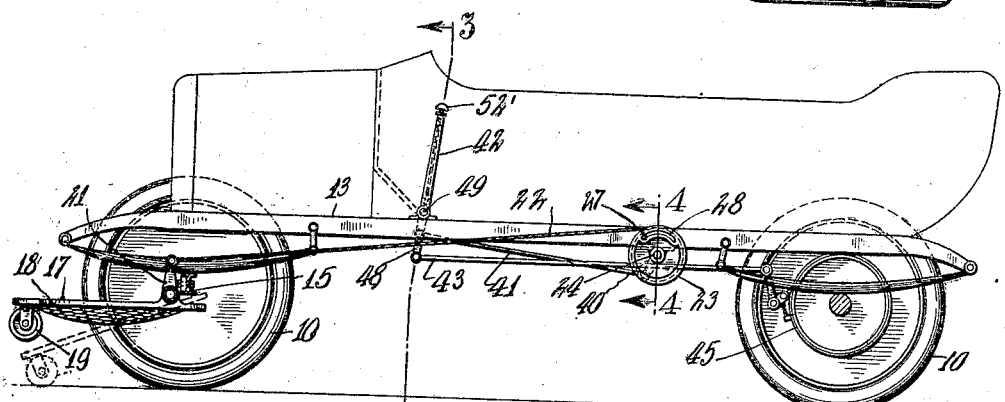
Fig. 2
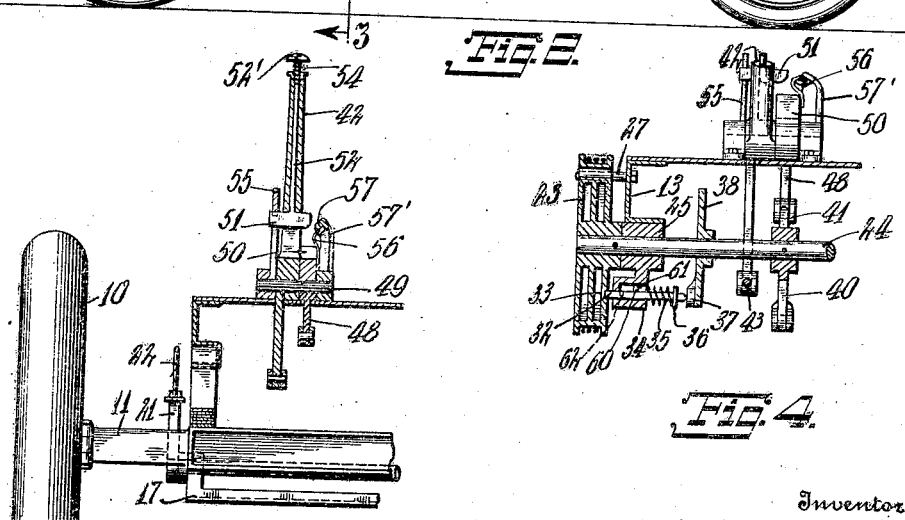
Fig. 3
Fig. 4
Inventor
Andres Garcia
By Colter H. Polacheck
Attorney Patented May 13, 1924.

1,493,929

UNITED STATES PATENT OFFICE.

ANDRÉS GARCIA, OF BROOKLYN, NEW YORK.

AUTOMOBILE FENDER AND BRAKE.

Application filed August 10, 1923. Serial No. 656,636.

*To all whom it may concern:*

Be it known that I, ANDRÉS GARCIA, a subject of the King of Spain, residing at Brooklyn, in the county of Kings and State of New York, have invented certain new and useful Improvements in Automobile Fenders and Brakes, of which the following is a specification.

This invention relates to a fender for automobiles or other vehicles adapted to operate in conjunction with the usual emergency brake with which such vehicles are commonly equipped, so as to be automatically swung down to operative position when the said brake is applied.

The invention has for an object the provision of a novel fender of this sort characterized by simplicity of construction and by rapidity of movement into operative position.

For further comprehension of the invention, and of the objects and advantages thereof, reference will be had to the following description and accompanying drawing, and to the appended claims in which the various novel features of the invention are more particularly set forth.

Fig. 1 of the drawings is a plan view showing the under part of an automobile with my improved fender applied thereto.

Fig. 2 is a side view.

Fig. 3 is an enlarged fragmentary transverse sectional view taken on the line 3—3 of Fig. 2.

Fig. 4 is a like view but taken on the line 4—4 of Fig. 2.

Referring now to the drawings the reference numeral 10 indicates the usual wheels of an automobile, the front axle being numbered 11 and the rear axle 12, while the main side frame members of the chassis are indicated at 13. Journaled in suitable brackets such as 15 on the front axle 11 is a transverse shaft 16 to which is fixed the fender frame 17 to which is secured an ordinary net 18, small depending rollers 19 being carried by the fender at the front edge thereof. Extending rigidly upward from the fender frame are arms 21 to the upper ends of which are attached the cables 22 which extend rearwardly and are wound at their rear ends on drums 23 fixed to opposite ends of another transverse shaft 24 which is supported in suitable bearings such as 25 fixed to the frame members 13. Coiled around the shaft which supports the fender is a spring which has one end connected to the said shaft and the other end connected to the axle and which normally acts to urge the fender downward. Rotary movement of the shaft 24 is limited by a pin 27 fixed on one of the frame members 13 and projecting into an arcuate slot 28 in one of the drums.

The fender is held in raised position by means of a pin 32 which engages in an aperture 33 in the radial wall of one of the drums 23 and is slidably supported in a lug 34 depending from one of the bearing elements 25. Surrounding the pin 32 is a coiled expansion spring 35 which bears against a collar 36 on the pin and presses it in a direction to withdraw it from the aperture 33. This pin is held in position engaging in the aperture 33 by means of a cam member 37 on a disk 38 fixed to the shaft 24.

Fixed also to the shaft 24 is an arm 40 which is connected by a link 41 with a part releasably engaging the emergency brake lever 42. From this lever the usual rod 43 leads backward to operate the emergency brake, which latter is indicated generally at 45. This part just referred to is an arm 48 fulcrumed between its ends on the same fulcrum pin 49 as the lever 42 having the link 41 connected to its lower end. The upper end of this arm is formed with a longitudinal slot 50 which is adapted to be engaged by one end of a crosspiece 51 on the lower end of a rod 52 slidable in the lever 42 and normally held in position with its end raised above the slot 50 in arm 48 by an expansion spring 54 surrounding the upper end of the rod 52 and bearing upward on the head 52' of the rod. To hold the lever 52 against movement the crosspiece 51 is adapted to engage a segment 55 formed with the usual spaced notches, the parts being so arranged that the crosspiece disengages from the said segment before it engages in the slot 50. To hold the arm 48 against movement it carries a flat spring 56 which normally engages in a notch 57 in a fixed member 57' but is pushed out of said notch by the crosspiece 51 when the latter is moved to engage in the notch 50.

In ordinary setting of the brake the rod 52 is depressed just sufficient to clear the segment 55, while if the fender is to be released the rod is depressed to its fullest extent and the movement of the lever will then rock the shaft 24 and cause the cam 37 to move away from the end of the pin 32 and the latter will disengage from the drum 23, allowing the fender to fall.

To facilitate resetting of the fender a stud 60 on the pin 32 engages in a longitudinal groove 61 in the lug 34, which groove has an angular offset 62 on its inner end. The drum is swung backward when the fender is to be raised until the pin 27 strikes the end of the arcuate slot 28, in which position the pin 32 registers with the aperture 33. The pin 32 is then pushed inward to its fullest extent and given a slight turn to bring the stud 60 into the offset 62. The pin will then hold the drums against rotation until the arm 48 is reset with the cam 37 in position registering with the pin 32, after which the latter is released to bear on the cam.

Having thus described my invention what I claim as new and desire to protect by Letters Patent of the United States is as follows:

1. In an automobile, a hinged fender, an emergency brake, a lever therefor, a drum, a cable leading from said fender to said drum to hold the fender raised, means holding said drum against rotation, and a device adapted to be operated by said lever for releasing said means, said means comprising a pin engaging in an aperture in said drum.

2. In an automobile, a hinged fender, an emergency brake, a lever therefor, a drum, a cable leading from said fender to said drum to hold the fender raised, a locking pin for said drum adapted to engage in an aperture in the latter, a spring urging said pin out of said aperture, a rotary cam element holding said pin in operative position, and a member adapted to be operatively connected with said lever for rotating said cam element.

3. In an automobile, a hinged fender, an emergency brake, a lever therefor, a drum, a cable leading from said fender to said drum to hold the fender raised, a locking pin for said drum adapted to engage in an aperture in the latter, a spring urging said pin out of said aperture, a rotary cam element holding said pin in operative position, and a member adapted to be operatively connected with said lever for rotating said cam element, said member comprising an arm having a slot in one end adapted to receive an element carried by said lever.

In testimony whereof I have affixed my signature.

ANDRÉS GARCIA.